United States Patent
Puiu et al.

(10) Patent No.: US 6,848,550 B2
(45) Date of Patent: Feb. 1, 2005

(54) TORQUE TRANSFER SYSTEM WITH TWO STAGE BALL RAMP/CLUTCH ACTUATION

(75) Inventors: Dumitru Puiu, Sterling Heights, MI (US); Carl D. Schleuder, Novi, MI (US); Malcolm E. Kirkwood, Livonia, MI (US)

(73) Assignee: Magna Drivetrain of America, Inc., Troy, MI (US)

( * ) Notice: Subject to any disclaimer, the term of this patent is extended or adjusted under 35 U.S.C. 154(b) by 0 days.

(21) Appl. No.: 10/387,098

(22) Filed: Mar. 12, 2003

(65) Prior Publication Data

US 2004/0180748 A1 Sep. 16, 2004

(51) Int. Cl.[7] .............................................. F16D 43/20
(52) U.S. Cl. ...................... 192/35; 192/84.6; 192/84.7
(58) Field of Search .................. 192/35, 84.6, 84.7, 192/70.21, 48.7

(56) References Cited

U.S. PATENT DOCUMENTS

| | | | |
|---|---|---|---|
| 2,091,268 A | 8/1937 | Colman | |
| 4,895,236 A | 1/1990 | Sakakibara et al. | |
| 5,083,986 A | 1/1992 | Teraoka et al. | 192/35 |
| 5,332,060 A | 7/1994 | Sperduti et al. | |
| 5,366,419 A | 11/1994 | Oda | |
| 5,407,024 A | 4/1995 | Watson et al. | |
| 5,485,904 A | 1/1996 | Organek et al. | 192/35 |
| 5,915,513 A | 6/1999 | Isley, Jr. et al. | 192/35 |
| 5,954,173 A | 9/1999 | Sakai et al. | 192/35 |
| 6,374,958 B1 | 4/2002 | Usui et al. | |
| 6,460,677 B1 | 10/2002 | Roscoe | 192/84.7 |
| 6,691,845 B2 * | 2/2004 | Showalter | 192/35 |

* cited by examiner

Primary Examiner—Thomas Williams
(74) Attorney, Agent, or Firm—Harness, Dickey & Pierce P.L.C.

(57) ABSTRACT

A power transfer system is provided and equipped with a torque transfer coupling which includes a stage 2 clutch and a clutch actuator. The clutch actuator includes stage 1 and stage 2 ball ramp actuators as well as a stage 1 clutch operably positioned between the ball ramp actuators to operatively engage the stage 2 clutch and vary the frictional engagement thereof.

22 Claims, 8 Drawing Sheets

TORQUE TRANSFER SYSTEM WITH TWO STAGE BALL RAMP/CLUTCH ACTUATION

FIELD OF THE INVENTION

The present invention relates generally to power transfer systems operable for controlling the distribution of drive torque between a pair of rotary shafts and, more particularly, to a torque transfer system consisting of a two stage ball ramp/clutch system. A stage 1 ball ramp/clutch is positioned in series with a stage 2 ball ramp/clutch. The torque from the first stage is multiplied by the second stage.

BACKGROUND OF THE INVENTION

In view of increased consumer demand for four-wheel drive vehicles, a variety of power transfer systems are currently being utilized in vehicular driveline applications for selectively directing power (i.e., drive torque) to the non-driven wheels of the vehicle. In many power transfer systems, a part-time transfer case is incorporated into the driveline and is normally operable in a two-wheel drive mode for delivering drive torque to the driven wheels. A mechanical mode shift mechanism can be selectively actuated by the vehicle operator for rigidly coupling the non-driven wheels to the driven wheels in order to establish a part-time four-wheel drive mode. As will be appreciated, a motor vehicle equipped with a part-time transfer case offers the vehicle operator the option of selectively shifting between the two-wheel drive mode during normal road conditions and the part-time four-wheel drive mode for operation under adverse road conditions.

Alternatively, it is known to use "on-demand" power transfer systems for automatically directing power to the non-driven wheels, without any input or action on the part of the vehicle operator, when traction is lost at the driven wheels. Modernly, it is known to incorporate the on-demand feature into a transfer case by replacing the mechanically-actuated mode shift mechanism with a clutch assembly that is interactively associated with an electronic control system and a sensor arrangement. During normal road conditions, the clutch assembly is maintained in a non-actuated condition such that the drive torque is only delivered to the driven wheels. However, when the sensors detect a low traction condition at the driven wheels, the clutch assembly is automatically actuated to deliver drive torque "on-demand" to the non-driven wheels. Moreover, the amount of drive torque transferred through the clutch assembly to the non-driven wheels can be varied as a function of specific vehicle dynamics, as detected by the sensor arrangement.

Conventional clutch assemblies typically include a clutch pack operably connected between a drive member and a driven member. A power-operated actuator controls engagement of the clutch pack. Specifically, torque is transferred from the drive member to the driven member by actuating the power-operated actuator. The power-operated actuator displaces an apply plate which acts on the clutch pack and increases the frictional engagement between the interleaved plates.

A variety of power-operated actuators have been used in the art. Exemplary embodiments include those disclosed in U.S. Pat. No. 5,407,024 wherein a ball-ramp arrangement is used to displace the apply plate when a current is provided to an induction motor. Another example disclosed in U.S. Pat. No. 5,332,060, assigned to the assignee of the present application, includes a linear actuator that pivots a lever arm to regulate the frictional forces applied to the clutch pack. Neither of these references incorporate two ball ramps to control actuation of the associated clutch. While the above actuator devices may perform adequately for their intended purpose, a need exists for torque multiplication that is less complex, reduces the number of friction generating components which lead to inefficiencies and larger motor requirements, and an annular arrangement that provides operational simplicity and reduced space requirements.

SUMMARY OF THE INVENTION

In view of the above, the present invention is directed to a power transfer system for a four-wheel drive vehicle equipped with a torque transfer assembly having a multi-plate friction clutch pack and a clutch actuator. The clutch actuator includes a stage 1 ball ramp actuator, a stage 2 ball ramp actuator and a stage 1 clutch operably positioned between the first and second stage ball ramp actuators. This clutch actuator arrangement yields numerous operational advantages over the prior art including, but not limited to, improved response characteristics with lower hysterisis, superior torque control improved system efficiency, low cost, and weight savings.

Further areas of applicability of the present invention will become apparent from the detailed description provided hereinafter. However, it should be understood that the detailed description and specific examples, while indicating preferred embodiments of the invention, are intended for purposes of illustration only, since various changes and modifications within the spirit and scope of the invention will become apparent to those skilled in the art from the following detailed description, attached drawings and claims.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

In general, the present invention is directed to a power transfer system which is operably installed between the driven and non-driven wheels of a four-wheel drive vehicle.

In operation, the amount of power (i.e., drive torque) transferred to the non-driven wheels is controllably regulated in accordance with various system and driver-initiated inputs for optimizing the tractive characteristics of the vehicle. In addition, the power transfer system may also include a mode select mechanism for permitting a vehicle operator to select between a two-drive wheel mode, a part-time four-wheel drive mode, and an "on-demand" drive mode.

Figure 1:
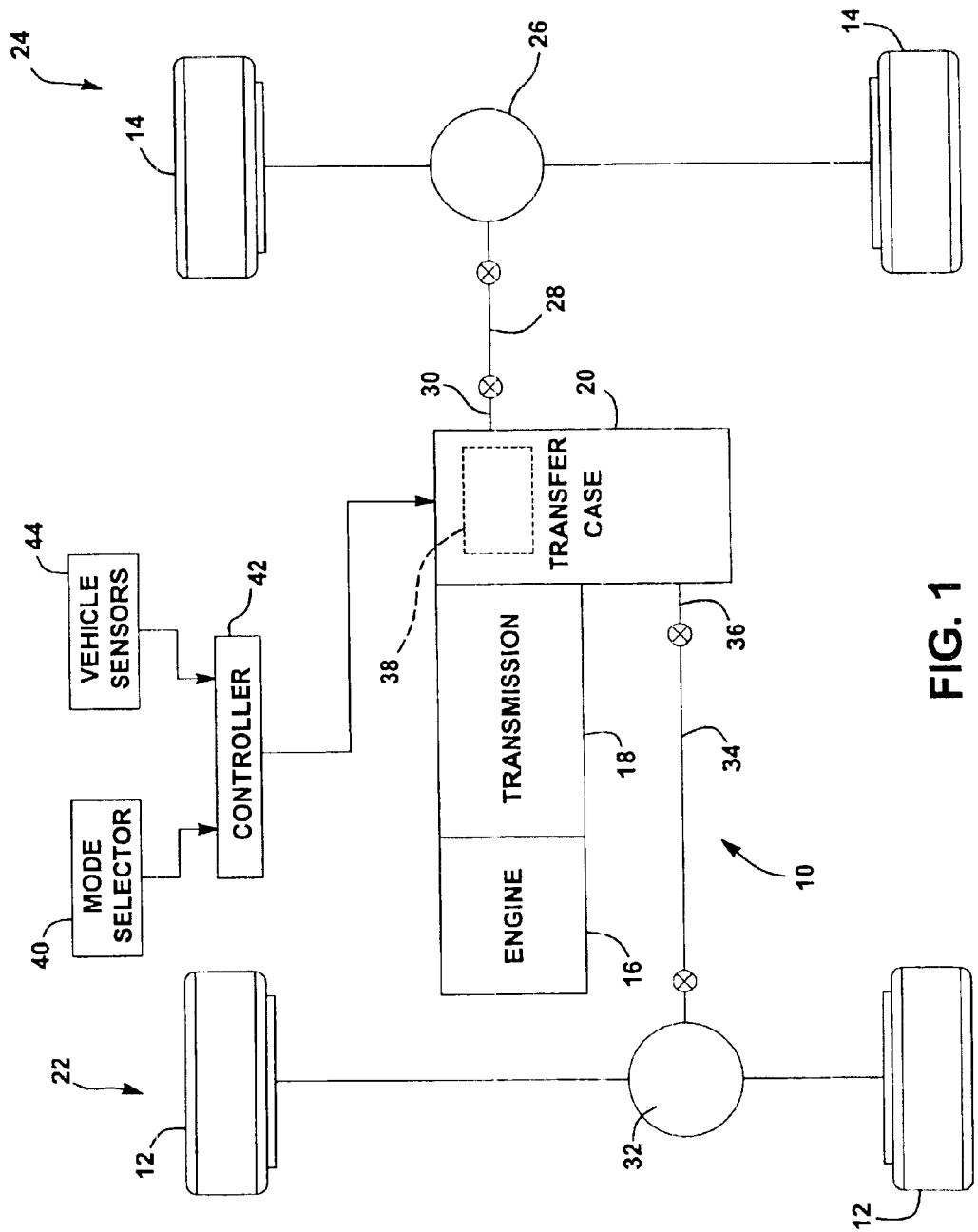
FIG. 1 is a schematic representation of an exemplary four-wheel drive vehicle having the power transfer system of the present invention incorporated therein.

Referring to FIG. 1 of the drawings, a drivetrain for a four-wheel drive vehicle is schematically shown interactively associated with a power transfer system 10. The motor vehicle drivetrain has a pair of front wheels 12 and rear wheels 14 both drivable from a source of power, such as an engine 16, through a transmission 18 which may be of either the manual or automatic type. In the particular embodiment shown, the drivetrain is a rear wheel drive system which incorporates a transfer case 20 operable to receive drive torque from engine 16 and transmission 18 for normally driving rear wheels 14 in a two-wheel drive mode of operation. Front wheels 12 ("driven" in 2WD mode) and rear wheels 14 are shown connected at opposite ends of front and rear axle assemblies 22 and 24, respectively. As is known, a rear differential 26 is interconnected between rear axle assembly 24 and one end of a rear drive shaft 28, the opposite end of which is interconnected to a first output shaft 30 of transfer case 20. Similarly, front axle assembly 22 includes a front differential 32 that is coupled to one end of a front drive shaft 34, the opposite end of which is coupled to a second output shaft 36 of transfer case 20. It is to be understood that the specific orientation of the drivetrain is merely exemplary in nature and that the drivetrain could be reversed for normally driving front wheels 12.

Transfer case 20 is equipped with a torque transfer assembly 38 for selectively delivering drive torque to front wheels 12 (i.e., the non-driven wheels) to establish a four-wheel drive mode of operation. The operating mode of transfer assembly 38 is generally controlled in response to a mode signal generated by a mode selector 40 and which is sent to a controller 42. Controller 42 also receives input signals from one or more vehicle sensors 44 that are indicative of various operational characteristic of the vehicle.

When the two-wheel drive mode is selected, all drive torque is delivered from first output shaft 30 to rear wheels 14 and transfer assembly 38 is maintained in a "non-actuated" condition. When the part-time four-wheel drive mode is selected, transfer assembly 38 is fully actuated and maintained in a "lock-up" condition such that second output shaft 36 is, in effect, rigidly coupled for driven rotation with first output shaft 30. When the "on-demand" drive mode is selected, controller 42 controls the degree of actuation of transfer assembly 38 for varying the amount of drive torque directed to front wheels 12 through transfer assembly 38 as a function of the sensor input signals for providing improved tractive performance when needed. In addition, controller 42 is adapted to controllably modulate the actuated state of transfer assembly 38 as will be described in greater detail hereinafter. By way of example rather than limitation, the control scheme generally disclosed in U.S. Pat. No. 5,332,060 issued Jul. 26, 1994 to Sperduti et al. and assigned to the common assignee of the present invention (the disclosure of which is hereby incorporated by reference) can be used to control adaptive actuation of transfer assembly 38 during on-demand operation.

Figure 2:
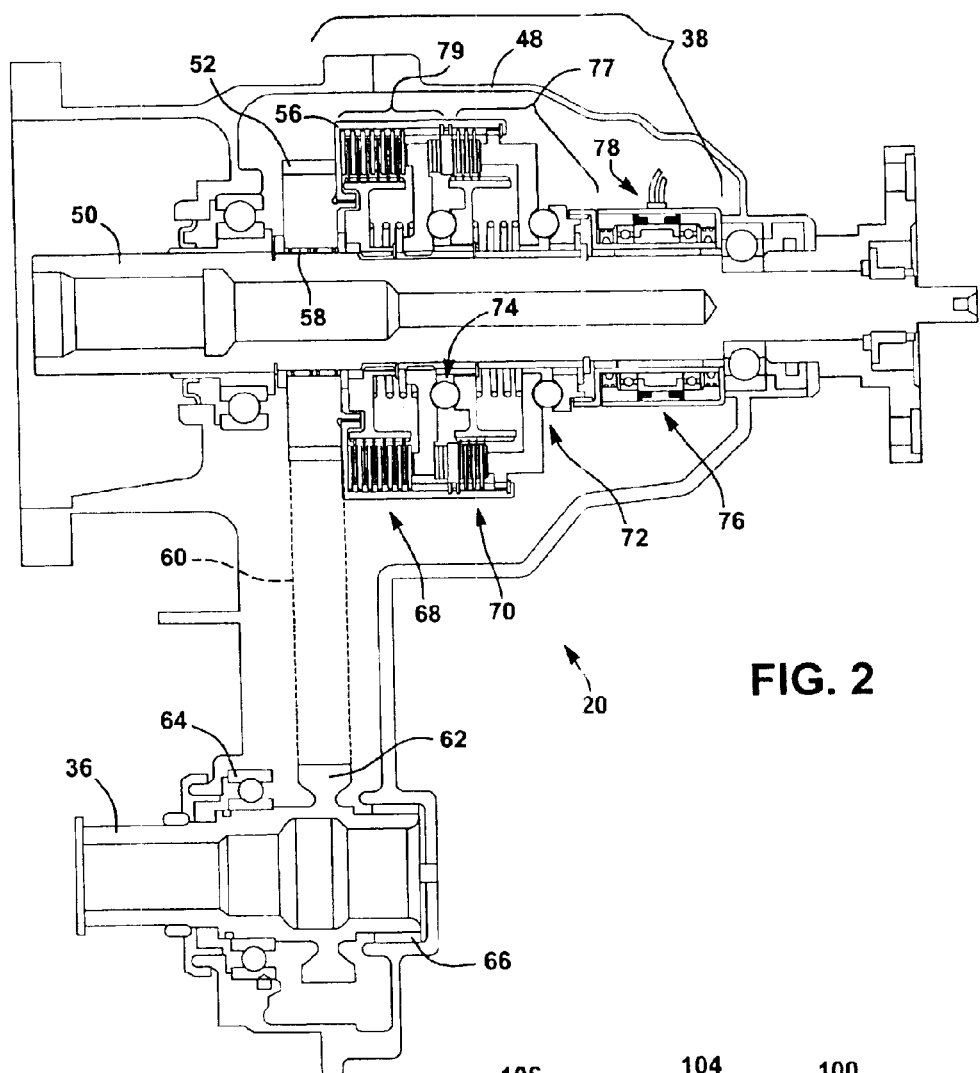
FIG. 2 is a sectional view of a transfer case associated with the power transfer system and which includes a clutch assembly and a clutch actuator.

Transfer case 20 is shown in FIG. 2 to include a housing 48 formed by a series of modular sections that are suitably interconnected in a conventional manner. A transmission output shaft (not shown) couples transmission 18 (FIG. 1) to a mainshaft 50 of transfer case 20 for supplying power thereto. In the embodiment shown, first output shaft 30 (FIG. 1) is connected to mainshaft 50 which is supported for rotation within housing 48. For simplicity, the illustrated embodiment shows mainshaft 50 extending through the transfer case 20 so as to define a single-speed power transfer unit. Those skilled in the art will appreciate that a two-speed version of transfer case 20 could likewise be used in association with the novel active torque bias clutch system of the present invention. Examples of known planetary two-speed gearsets and range clutch arrangements are shown in commonly-owned U.S. Pat. Nos. 5,700,222, and 5,836,847.

With continued references to FIG. 2, transfer assembly 38 is shown for transferring drive torque from mainshaft 50 to front wheels 12. More specifically, a drive sprocket 52 is fixed (i.e., splined) for rotation on a portion of a cylindrical drum 56 associated with transfer assembly 38. Sprocket 52 is rotatably supported on mainshaft 50 by one or more suitable bearing assemblies 58. Drive sprocket 52 drivingly engages a chain 60 which is coupled to a lower driven sprocket 62. Driven sprocket 62 is coupled to, or may be an integral portion of, second output shaft 36 of transfer case 20. Second output shaft 36 is supported for rotation within housing 48 by suitable bearing assemblies 64 and 66. As noted in FIG. 1, second output shaft 36 is operably connected to the motor vehicle's front wheels 12 via front drive shaft 34.

Transfer assembly 38 includes a multi-plate stage 2 clutch 68 and a multi-plate stage 1 clutch 70. A stage 1 ball ramp actuator 72 selectively operates stage 1 clutch 70. A stage 2 ball ramp actuator 74 selectively operates stage 2 clutch 68. Stage 1 ball ramp actuator 72 is selectively driven by an operator 76. In one embodiment, operator 76 is a DC electric motor assembly 78 connected in electrical communication with controller 42. Electric motor assembly 78 is drivingly coupled to stage 1 ball ramp actuator 72. As such, stage 1 ball ramp actuator 72 and stage 1 clutch 70 operate as a first torque amplifier 77 where output torque generated by electric motor assembly 78 is multiplied by stage 1 ball ramp actuator 72 and converted into a linear force to apply stage 1 clutch 70. Output torque generated by stage 1 clutch 70 is input to stage 2 ball ramp actuator 74.

Stage 2 ball ramp actuator 74 and stage 2 clutch 68 operate as a second torque amplifier 79. Stage 2 ball ramp actuator 74 multiplies the torque input from stage 1 clutch 70 and converts the torque to a linear application force acting on stage 2 clutch 68. Once stage 1 clutch 70 and stage 2 clutch 68 are engaged, transfer assembly 38 functions to transfer drive torque from mainshaft 50 to front wheels 12.

One skilled in the art will appreciate that the arrangement of first torque amplifier 77 acting in series with a second torque amplifier 79 provides a compound amplification of the output torque of electric motor assembly 78. For example, if electric motor assembly 78 outputs 1 lb-ft of torque and first torque multiplier 77 provides a mechanical advantage of 3, the output torque from first torque amplifier 77 is 3 lb-ft. If second torque amplifier also provides a mechanical advantage of 3, the output torque from second torque amplifier 79 will be 9 lb-ft based on a 3 lb-ft input from first torque amplifier 77 and a 1 lb-ft input from electric motor assembly 78. Accordingly, only a relatively small amount of electrical power is required to control a relatively large amount of power being transferred to front wheels 12.

Figure 3:
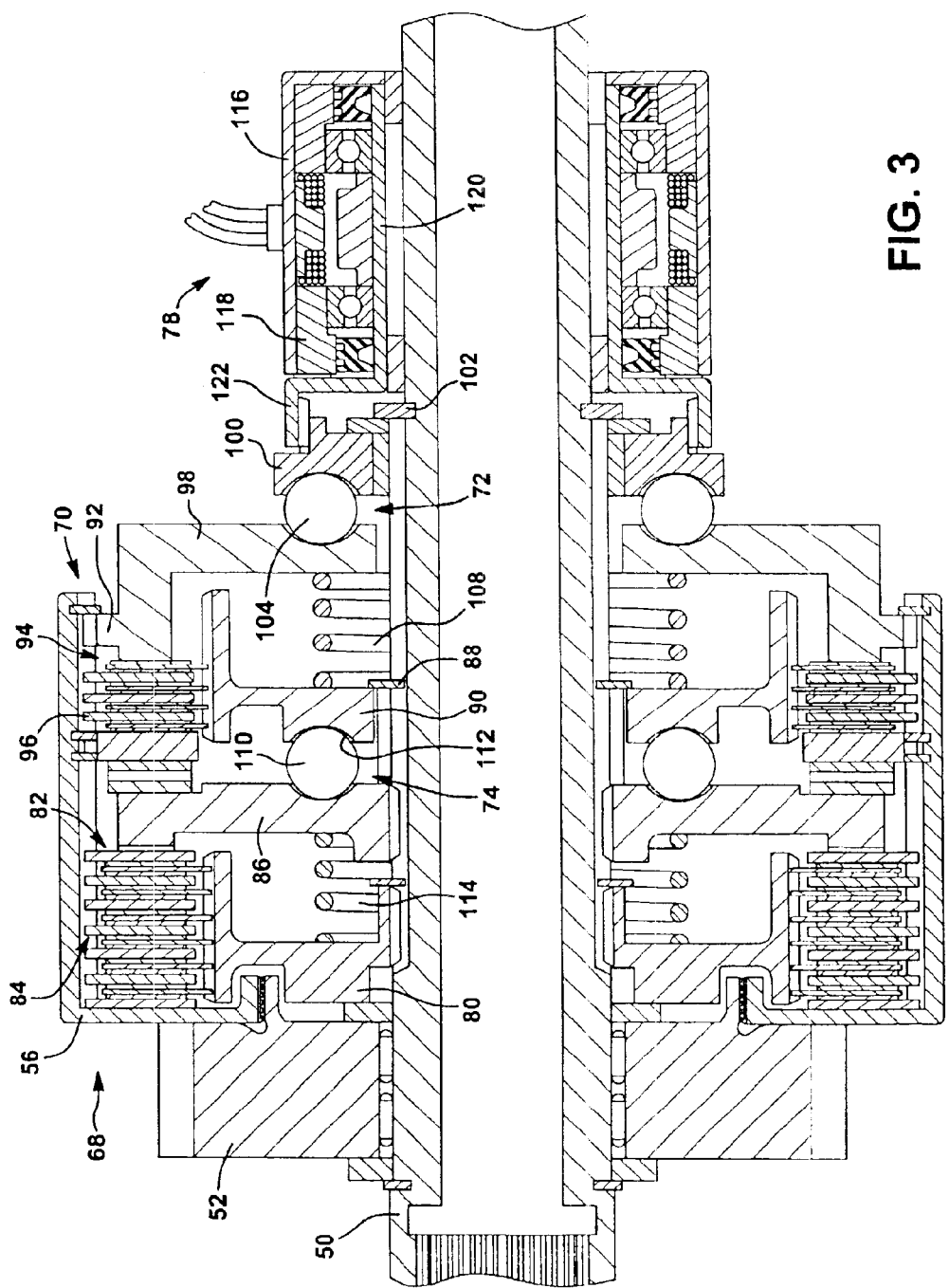
FIG. 3 is a partial sectional view of the clutch assembly and clutch actuator of FIG. 2.

FIG. 3 depicts stage 2 clutch 68 arranged to concentrically surround a portion of mainshaft 50. As noted, cylindrical drum 56 is fixedly secured to drive sprocket 52 so as to drive, or be driven by, front output shaft 36 of transfer case 20. In a preferred form, transfer assembly 38 also includes a clutch hub 80 that is concentrically surrounded by drum 56 and which is fixed (i.e., splined) to mainshaft 50 for rotation therewith. Thus, clutch hub 80 and drum 56 are capable of rotating relative to one another and form an internal chamber therebetween. Disposed within the internal chamber is a clutch pack 82 comprised of two sets of alternatively interleaved friction clutch plates 84 that are operable for transferring torque from mainshaft 50 through clutch hub 80 to drum 56 and, ultimately, to front output shaft 36 in response to a clutch engagement force applied thereto. One set of clutch plates, referred to as inner clutch plates, are mounted (i.e., splined) for rotation with clutch hub 80 while the second set of clutch plates, referred to as outer clutch plates, are mounted (i.e., splined) for rotation with drum 56. A pressure apply plate 86 is splined to mainshaft 50 and is axially movable with respect to the interleaved friction clutch plates of clutch pack 82. Thus, apply plate 86 selectively compresses interleaved clutch plates 84 so as to cause drive torque to be transferred through transfer assembly 38 as a function of the clutch engagement force exerted on apply plate 86 by stage 2 ball ramp actuator 74.

Stage 1 clutch 70 is a multi-plate clutch assembly arranged to concentrically surround a portion of mainshaft 50. Stage 1 clutch 70 includes a cylindrical drum 56. Stage 1 clutch 70 also includes a hub 90 that is concentrically surrounded by drum 56 and which is rotatably supported by mainshaft 50 and is axially maintained by ring 88. Hub 90 and cylindrical drum 56 are capable of rotating relative to one another and form an internal chamber 92 therebetween. A clutch pack 94 is disposed within internal chamber 92. Clutch pack 94 includes two sets of alternatively interleaved friction clutch plates 96 that are operable for transferring torque from mainshaft 50 through hub 90 to drum 56. A pusher cam 98 is splined to drum 56 and is axially movable with respect to friction clutch plates 96 of stage 1 clutch 70. Upon operation of stage 1 ball ramp actuator 72, pusher cam 98 axially translates to compress interleaved friction clutch plates 96 to cause drive torque to be transferred from hub 90 to drum 56.

Figure 4:
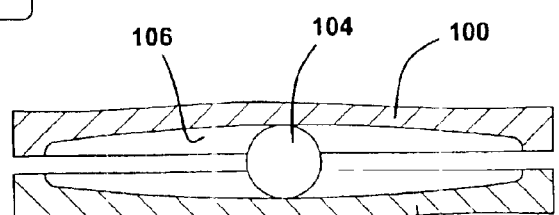
FIG. 4 is a sectional view of a portion of a ball ramp actuator associated with the transfer case shown in FIG. 2.

Stage 1 ball ramp actuator 72 includes a fixed cam 100 rotatably supported on mainshaft 50. Fixed cam 100 is restrained from axial movement by a retainer ring 102. A plurality of balls 104 are positioned between fixed cam 100 and pusher cam 98. As best shown in FIG. 4, fixed cam 100 and pusher cam 98 each include a plurality of tapered recesses 106 circumferentially spaced about the cam. The recesses on the pusher cam are aligned with the recesses on the fixed cam to define tapered pockets for retaining balls 104. A spring 108 is positioned between hub 90 and pusher cam 98. The force exerted from spring 108 causes balls 104 to seek the deepest portion of recesses 106. When balls 104 are positioned at this location, pusher cam 98 does not engage friction clutch plates 96. However, when electric motor assembly 78 is actuated to impart a rotational torque on fixed cam 100, balls 104 are displaced from the deepest portion of recesses 106 thereby converting rotational movement of fixed cam 100 into axial displacement of pusher cam 98. In one embodiment, recesses 106 are formed at a sufficient ramp angle to provide a mechanical advantage to apply plate 86.

Stage 2 ball ramp actuator 74 includes a plurality of balls 110 positioned within pairs of recesses 112 formed on hub 90 and apply plate 86. Recesses 112 are shaped substantially similar to recesses 106 as being substantially radially positioned and having a tapered cross section. A spring 114 is positioned between clutch hub 80 and apply plate 86. Stage 2 ball ramp actuator 74 functions substantially similarly to stage 1 ball ramp actuator 72. As such, spring 114 forces apply plate 86 toward balls 110 thereby causing balls 110 to find the largest pocket defined between recesses 112. When balls 110 are in this position, apply plate 86 is disengaged from interleaved friction clutch plates 84 and torque is not transmitted from mainshaft 50 to drum 56.

Electric motor assembly 78 includes a case 116 fixed to housing 48. Electric motor assembly 78 also includes a stator 118 coupled to case 116 and a rotor 120 generally supported on mainshaft 50. Electrical inputs to electric motor assembly 78 cause rotor 120 to rotate. Rotor 120 includes a flange 122 drivingly engaged with fixed cam 100. Accordingly, the torque input to fixed cam 100 may be varied by sending an appropriate signal from controller 42 to electric motor assembly 78.

In operation, controller 42 receives signals from sensors 44. Based on the data provided by sensors 44, controller 42 selectively determines the magnitude of electric current to be delivered to electric motor assembly 78. If electric motor assembly 78 is energized, rotor 120 provides output torque to fixed cam 100. The rotary motion of fixed cam 100 is converted into a linear translation of pusher cam 98. Pusher cam 98 in turn applies an actuation force to stage 1 clutch 70. Once engaged, stage 1 clutch 70 causes relative rotation between hub 90 and apply plate 86 and provides an amplified torque to stage 2 ball ramp actuator 74. Stage 2 ball ramp actuator 74 converts the relative rotation to linear translation of apply plate 86. Apply plate 86 supplies an amplified linear force to stage 2 clutch 68 to drivingly interconnect mainshaft 50 and drive sprocket 52.

Figure 5:
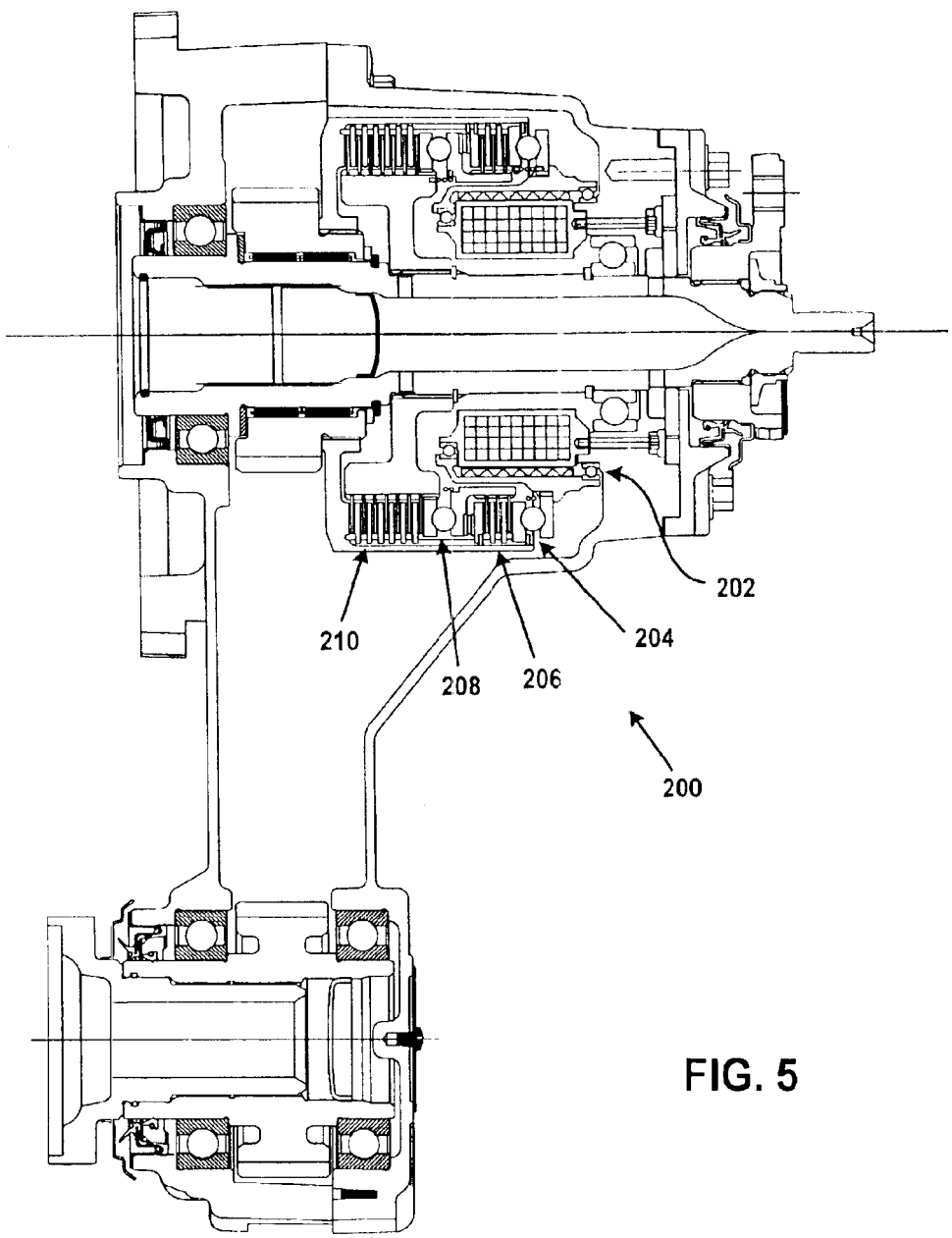
FIG. 5 depicts an alternative transfer case constructed in accordance with the teachings of the present invention.

FIG. 5 depicts an alternative transfer case 200 including an electric motor 202 providing an input torque to a stage 1 ball ramp actuator 204. Stage 1 ball ramp actuator 204 provides input to a stage 1 clutch 206. Stage 1 clutch 206 provides a rotary input to a stage 2 ball ramp actuator 208. Stage 2 ball ramp actuator 208 converts rotation to linear translation and applies stage 2 clutch 210. It should be appreciated that transfer case 200 functions substantially similarly to transfer assembly 38 previously described, but provides an alternate packaging scheme for each of the components within transfer case 200.

Figure 6:
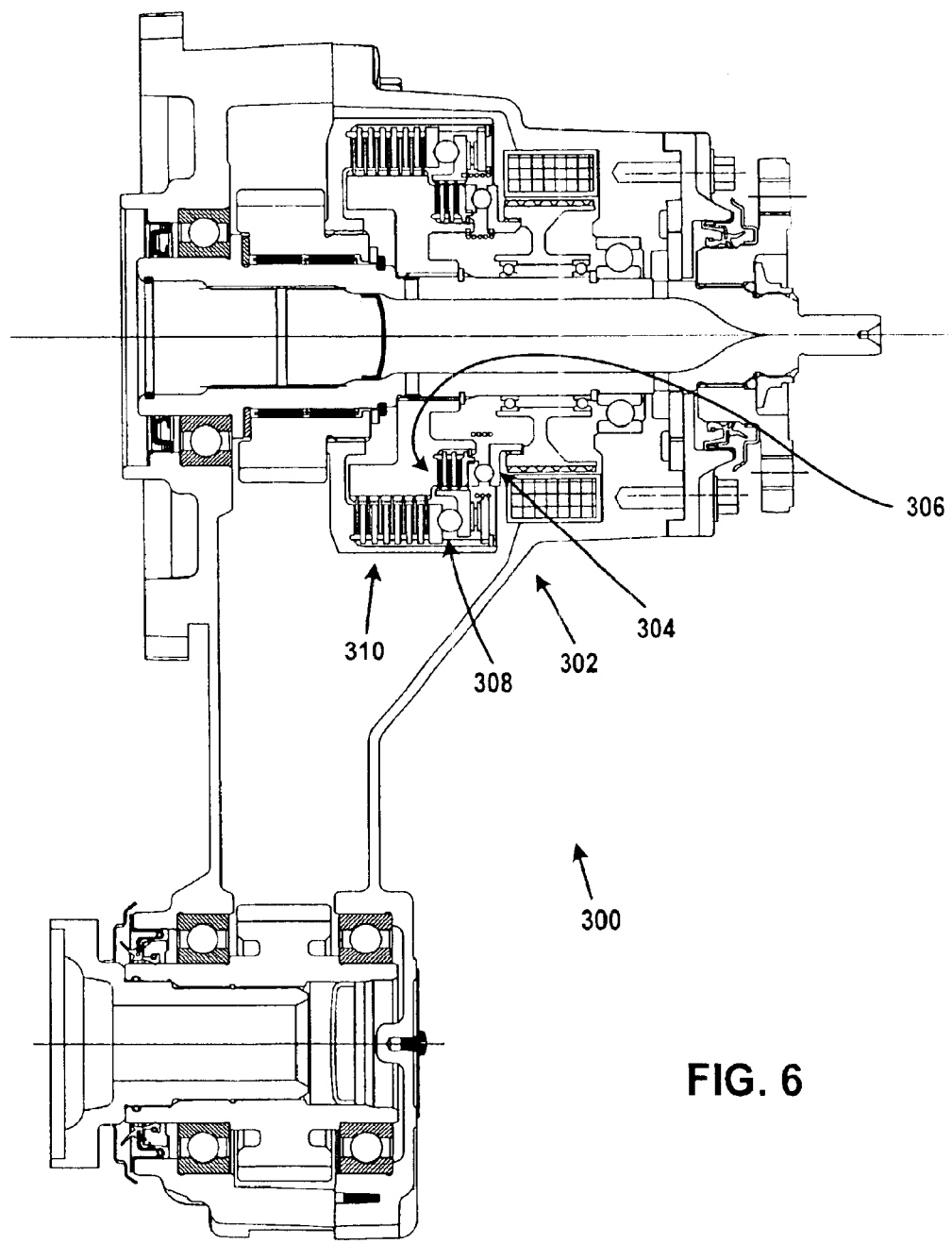
FIG. 6 depicts another alternative transfer case constructed in accordance with the teachings of the present invention.

FIG. 6 depicts another alternative embodiment transfer case 300. Transfer case 300 includes a transfer assembly 302 including a stage 1 ball ramp actuator 304, a stage 1 clutch 306, a stage 2 ball ramp actuator 308 and a stage 2 clutch 310. The embodiment show in FIG. 6 illustrates yet another packaging scheme of the afore-mentioned components. Additionally, it should be appreciated that transfer case 300 is not operable in a self-locking condition. Accordingly, the ramp angles of the ball ramp actuators are not limited for certain ranges of mechanical advantage. For example, the motor may unlock the ball ramp actuators to allow higher axial forces to be transmitted therethrough.

Figure 7:
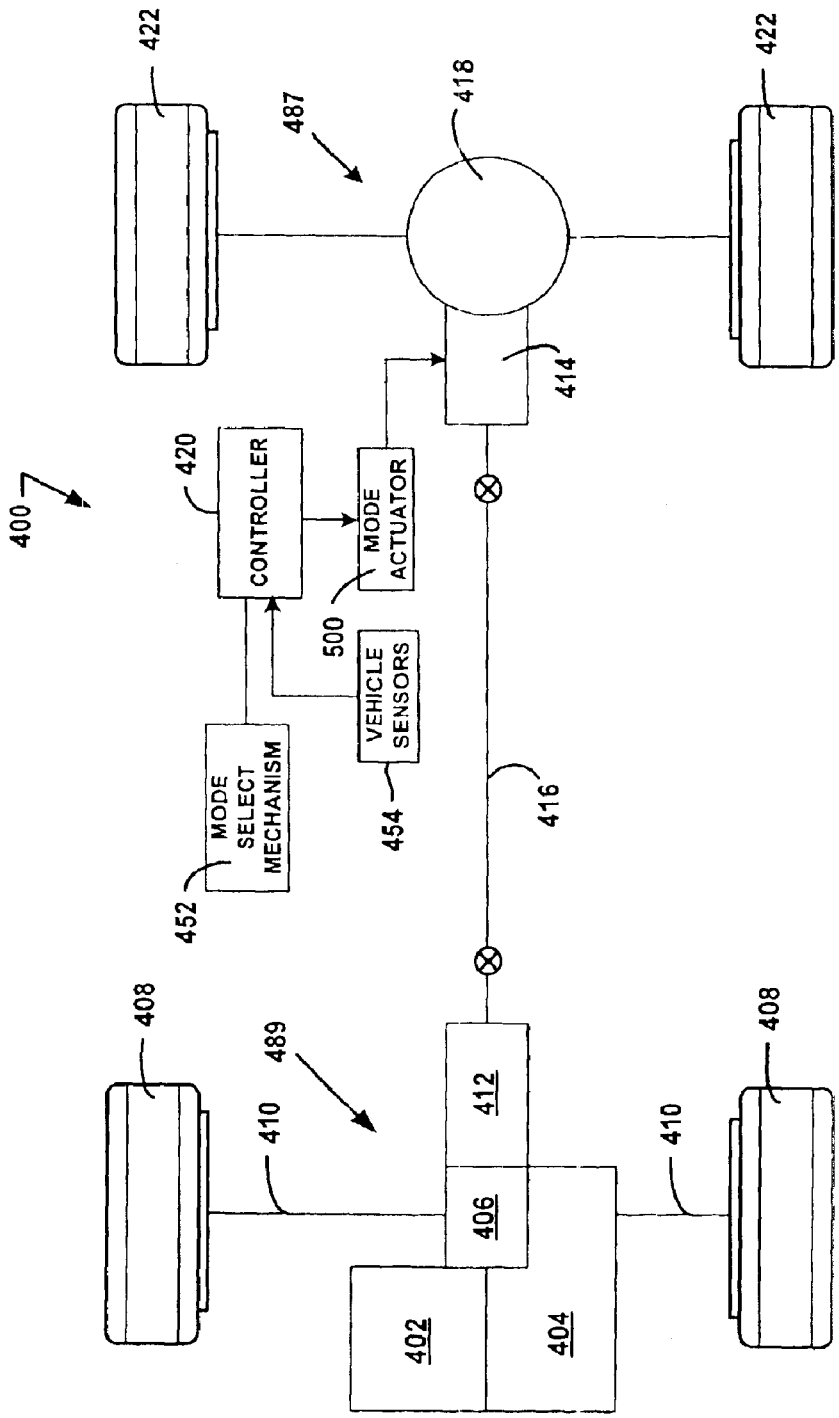
FIG. 7 is a schematic illustration of an alternative drivetrain for a four-wheel drive vehicle equipped with a power transmission device of the present invention.

To illustrate an alternative power transmission device to which the present invention is applicable, FIG. 7 schematically depicts a front-wheel based four-wheel drivetrain layout 400 for a motor vehicle. In particular, engine 402 drives a multi-speed transmission 404 having an integrated front differential unit 406 for driving front wheels 408 via axle shafts 410. A transfer unit 412 is also driven by transmission 404 for delivering drive torque to the input member of an in-line torque transfer coupling 414 via a drive shaft 416. In particular, the input member of transfer coupling 414 is coupled to drive shaft 416 while its output member is coupled to a drive component of rear differential 418. Accordingly, when sensors indicate the occurrence of a front wheel slip condition, controller 420 adaptively controls actuation of torque coupling 414 such that drive torque is delivered "on-demand" to rear wheels 422. It is contemplated that torque transfer coupling 414 would include a multi-plate transfer clutch and a clutch actuator that are generally similar in structure and function to that of any of the devices previously described herein. While shown in association with rear differential 418, it is contemplated that torque coupling 414 could also be operably located for transferring drive torque from transfer unit 412 to drive shaft 416.

Figure 8:
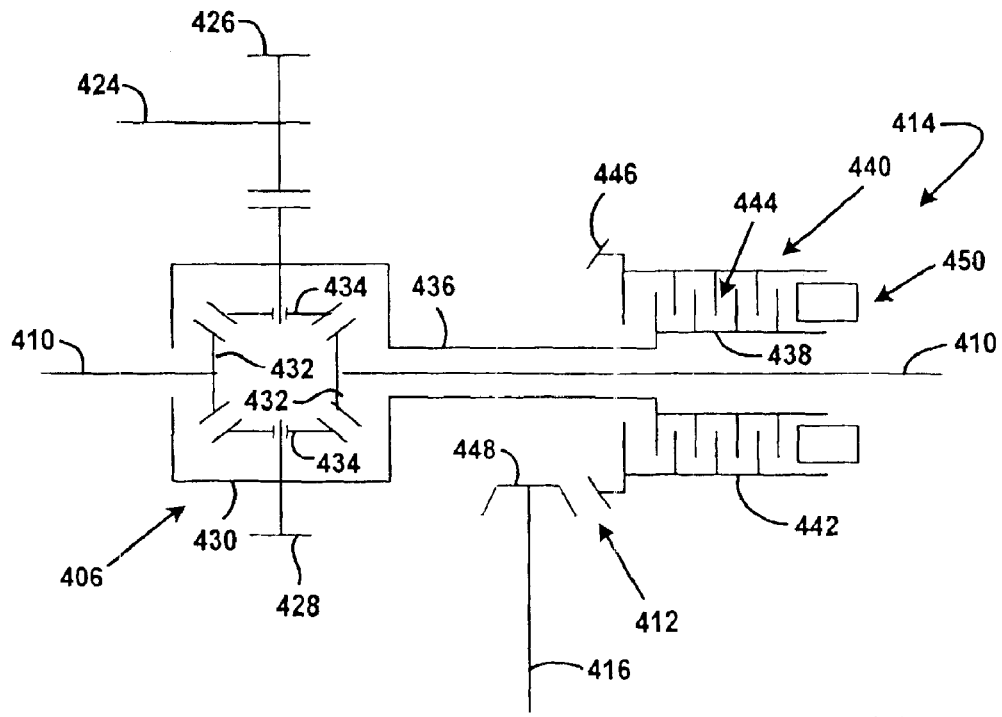
FIGS. 8 through 11 are schematic illustrations of alternative embodiments of power transmission devices according to the present invention.

Referring now to FIG. 8, torque coupling 414 is schematically illustrated in association with an on-demand four-wheel drive system based on a front-wheel drive vehicle similar to that shown in FIG. 7. In particular, an output shaft 424 of transmission 404 is shown to drive an output gear 426 which, in turn, drives an input gear 428 fixed to a carrier 430 associated with front differential unit 406. To provide drive torque to front wheels 408, front differential unit 406 includes a pair of side gears 432 that are connected to front wheels 408 via axleshafts 410. Differential unit 406 also includes pinions 434 that are rotatably supported on pinion shafts fixed to carrier 430 and which are meshed with side gears 432. A transfer shaft 436 is provided to transfer drive torque from carrier 430 to a clutch hub 438 associated with a multi-pate clutch assembly 440. Clutch assembly 440 further includes a drum 442 and a clutch pack 444 having interleaved clutch plates operably connected between hub 438 and drum 442.

Transfer unit 412 is a right-angled drive mechanism including a ring gear 446 fixed for rotation with drum 442 of clutch assembly 440 which is meshed with a pinion gear 448 fixed for rotation with drive shaft 416. As seen, a clutch actuator 450 is schematically illustrated for controlling actuation of clutch assembly 440. According to the present invention, actuator 450 is similar to any one of the various clutch actuators previously described in that an electric motor is supplied with electric current for providing torque to a stage 1 ball ramp actuator which inputs an axial force to a stage 1 clutch. Stage 1 clutch provides torque to a stage 2 ball ramp actuator which converts rotational torque to axial force for engaging clutch pack or stage 2 clutch 444. In operation, drive torque is transferred from the primary (i.e., front) driveline to the secondary (i.e., rear) driveline in accordance with the particular mode selected by the vehicle operator via mode selector 452. For example, if the on-demand 4WD mode is selected, controller 420 modulates actuation of clutch actuator 450 in response to the vehicle operating conditions detected by sensors 454 by varying the value of the electric control signal sent to the electric motor coil. In this manner, the level of clutch engagement and the amount of drive torque that is transferred through clutch pack 444 to the rear driveline through transfer unit 412 and drive shaft 416 is adaptively controlled. Selection of a locked or part-time 4WD mode results in full engagement of clutch assembly 440 for rigidly coupling the front driveline to the rear driveline. In some applications, the mode selector 452 may be eliminated such that only the on-demand 4WD mode is available so as to continuously provide adaptive traction control without input from the vehicle operator.

Figure 9:
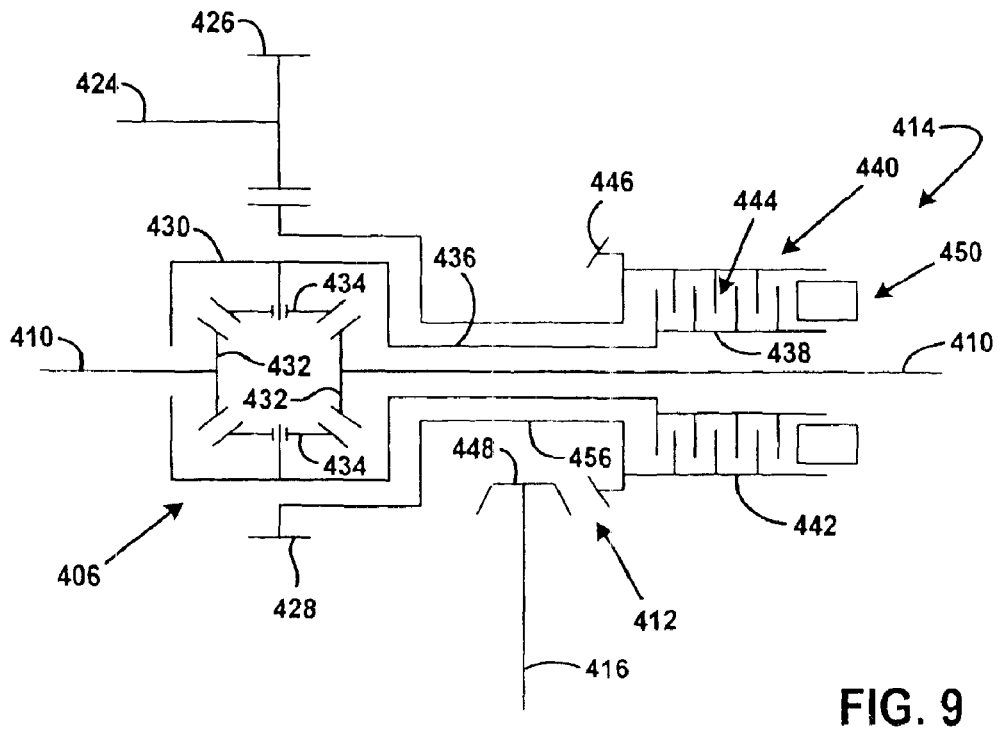

FIG. 9 illustrates a modified version of FIG. 8 wherein an on-demand four-wheel drive system is shown based on a rear-wheel drive motor vehicle that is arranged to normally deliver drive torque to rear wheels 422 while selectively transmitting drive torque to front wheels 408 through torque coupling 414. In this arrangement, drive torque is transmitted directly from transmission output shaft 424 to transfer unit 412 via a drive shaft 456 interconnecting input gear 428 to ring gear 446. To provide drive torque to front wheels 408, torque coupling 414 is now shown operably disposed between drive shaft 456 and transfer shaft 436. In particular, clutch assembly 440 is arranged such that drum 442 is driven with ring gear 446 by drive shaft 456. As such, actuation of clutch actuator 450 functions to transfer torque from drum 442 through clutch pack 444 to hub 438 which, in turn, drives carrier 430 of front differential unit 406 via transfer shaft 436. Again, the vehicle could be equipped with mode selector 452 to permit selection by the vehicle operator of either the adaptively controlled on-demand 4WD mode or the locked part-time 4WD mode. In vehicles without mode selector 452, the on-demand 4WD mode is the only mode available and which provides continuous adaptive traction control with input from the vehicle operator.

Figure 10:
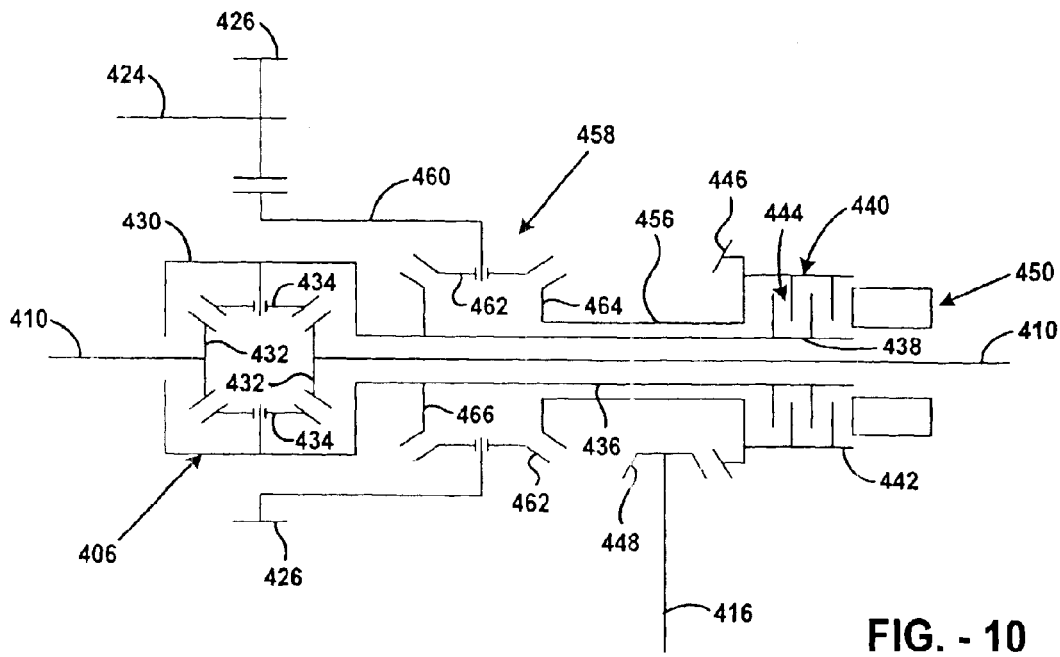

In addition to the on-demand 4WD systems shown previously, the power transmission (clutch actuator and clutch assembly) technology of the present invention can likewise be used in full-time 4WD systems to adaptively bias the torque distribution transmitted by a center or "interaxle" differential unit to the front and rear drivelines. For example, FIG. 10 schematically illustrates a full-time four-wheel drive system which is generally similar to the on-demand four-wheel drive system shown in FIG. 9 with the exception that an interaxle differential unit 458 is now operably installed between carrier 430 of front differential unit 406 and transfer shaft 436. In particular, input gear 428 is fixed for rotation with a carrier 460 of interaxle differential 458 from which pinion gears 462 are rotatably supported. A first side gear 464 is meshed with pinion gears 462 and is fixed for rotation with drive shaft 456 so as to be drivingly interconnected to the rear driveline through transfer unit 412. Likewise, a second side gear 466 is meshed with pinion gears 462 and is fixed for rotation with carrier 430 of front differential unit 406 so as to be drivingly interconnected to the front driveline. In operation, when sensor 454 detects a vehicle operating condition, such as excessive interaxle slip, controller 420 adaptively controls activation of the electric motor associated with clutch actuator 450 for controlling engagement of clutch assembly 440 and thus the torque biasing between the front and rear driveline.

Figure 11:
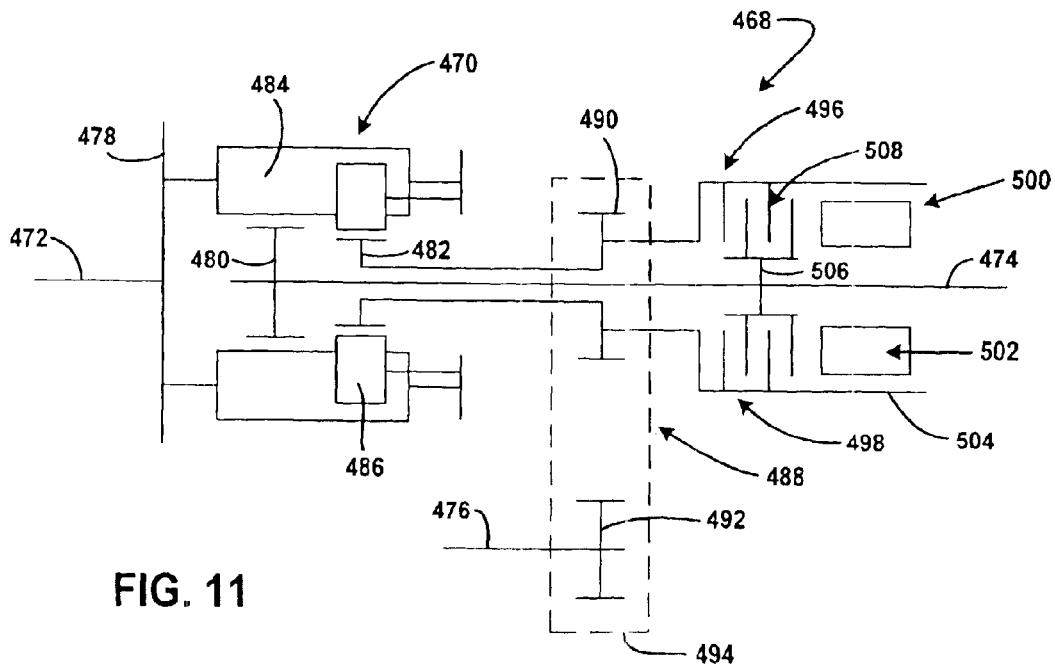

Referring now to FIG. 11, a full-time 4WD system is shown to include a transfer case 468 equipped with an interaxle differential 470 between an input shaft 472 and output shafts 474 and 476. Differential 470 includes an input defined as a planet carrier 478, a first output defined as a first sun gear 480, a second output defined as a second sun gear 482, and a gearset for permitting speed differentiation between first and second sun gears 480 and 482. The gearset includes meshed pairs of first planet gears 484 and second pinions 486 which are rotatably supported by carrier 478. First planet gears 484 are shown to mesh with first sun gear 480 while second pinions 486 are meshed with second sun gear 482. First sun gear 480 is fixed for rotation with rear output shaft 474 so as to transmit drive torque to rear driveline 487 (FIG. 7). To transmit drive torque to front driveline 489, second sun gear 482 is coupled to a transfer assembly 488 which includes a first sprocket 490 rotatably supported on rear output shaft 474, a second sprocket 492 fixed to front output shaft 476, and a power chain 494.

Transfer case 468 further includes a biasing clutch 496 having a multi-plate clutch assembly 498 and a mode actuator 500 having a clutch actuator 502. Clutch assembly 498 includes a drum 504 fixed for rotation with first sprocket 490, a hub 506 fixed for rotation with rear output shaft 474, and a multi-plate clutch pack 508 operably disposed therebetween. Clutch actuator 502 includes an electric motor that can be energized for controlling the movement of a stage 1 ball ramp actuator, a stage 1 clutch and a stage 2 ball ramp actuator relative to clutch pack or stage 2 clutch 508.

A number of preferred embodiments have been disclosed to provide those skilled in the art an understanding of the best mode currently contemplated for the operation and construction of the present invention. The invention being thus described, it will be obvious that various modifications can be made without departing from the true spirit and scope of the invention, and all such modifications as would be considered by those skilled in the art are intended to be included within the scope of the following claims.

What is claimed is:

1. A power transmission device comprising:
   a rotary input member adapted to receive drive torque from a source of torque;
   a rotary output member adapted to provide drive torque to an output device; and
   a torque transfer mechanism operable for transferring drive torque from said input member to said output member, said torque transfer mechanism including a first torque amplifier and a second torque amplifier operably disposed between said input member and said output member, said first torque amplifier including a first ball ramp actuator and a first friction clutch, said second torque amplifier including a second ball ramp actuator and a second friction clutch, wherein said torque transfer mechanism further includes an operator for selectively providing an input torque to said first torque amplifier and wherein said first torque amplifier is coupled to said second torque amplifier such that an amplified torque is supplied from said first torque amplifier to said second torque amplifier, wherein said first ball ramp actuator includes a plurality of balls positioned in driving engagement with a first cam and a second cam, wherein said second cam provides an input force to said first friction clutch, said second cam being splined to a clutch drum of said first friction clutch.

2. The power transmission device of claim 1 wherein output torque from said first torque amplifier is input to said second ball ramp actuator.

3. The power transmission device of claim 1, wherein said first ball ramp actuator includes a first spring for biasing said second cam plate of said first ball ramp actuator toward said first cam plate of said first ball ramp actuator and said second ball ramp actuator includes a second spring for biasing said second cam plate of said second ball ramp actuator toward said first cam plate of said second ball ramp actuator.

4. The power transmission device of claim 1 wherein said first friction clutch includes a hub rotatably fixed to one of said rotary input and said rotary output members wherein said second ball ramp actuator includes a first cam coupled to said rotary input member.

5. The power transmission device of claim 4 wherein said second ball ramp actuator includes an axially moveable second cam selectively providing an axial input force to said second friction clutch.

6. The power transmission device of claim 1 wherein said rotary output member is rotatably supported on said rotary input member.

7. The power transmission device of claim 1 further including a controller selectively signaling said operator to provide torque to said first torque amplifier.

8. The power transmission device of claim 7 wherein said operator includes a DC electric motor positioned substantially concentrically about one of said rotary input and rotary output members.

9. A power transmission device comprising:
   a rotary input member adapted to receive drive torque from a source of torque;
   a rotary output member adapted to provide drive torque to an output device; and
   a torque transfer mechanism operable for transferring drive torque from said input member to said output member, said torque transfer mechanism including a stage 2 clutch assembly operably disposed between said input member and said output member and a clutch actuator operable for applying a clutch engagement force to said stage 2 clutch assembly, said clutch actuator including an operator, a stage 1 ball ramp actuator, a stage 2 ball ramp actuator, and a stage 1 clutch operably positioned between said stage 1 and stage 2 ball ramp actuators, said operator being drivingly coupled to said stage 1 ball ramp actuator, wherein said stage 1 ball ramp actuator and said stage 1 clutch assembly are operable to amplify torque from said operator and provide said amplified torque to said stage 2 ball ramp actuator, said stage 1 ball ramp actuator includes a first cam plate, a second cam plate and a plurality of balls positioned in engagement with said first and second cam plates with said second cam plate formed as a unitary member which directly engages said stage 1 clutch.

10. The power transmission device of claim 9, where in said stage 1 ball ramp actuator includes a first spring for biasing said second cam plate of said stage 1 ball ramp actuator toward said first cam plate of said stage 1 ball ramp actuator and said stage 2 ball ramp actuator includes a second spring for biasing a second cam plate of said stage 2 ball ramp actuator toward a first cam plate of said stage 2 ball ramp actuator.

11. The power transmission device of claim 9 wherein said stage 2 ball ramp actuator includes a first cam plate, a second cam plate and a plurality of balls positioned in engagement with said first and second cam plates, wherein said second cam plate is axially moveable to supply an input force to said stage 2 clutch assembly.

12. The power transmission device of claim 9 further including a controller operable to electrically signal said operator to provide output torque.

13. The power transmission device of claim 12 wherein said operator includes a DC electric motor positioned substantially concentrically about one of said rotary input and rotary output members.

14. The power transmission device of claim 9 wherein said first cam plate of said stage 1 ball ramp actuator is fixed for rotation with said operator.

15. The power transmission device of claim 14 wherein said first cam plate of said stage 1 ball ramp actuator is rotatably supported on one of said input and output members.

16. A power transmission device comprising:
   a rotary input member adapted to receive drive torque from a source of torque;
   a rotary output member adapted to provide drive torque to an output device; and
   a torque transfer mechanism operable for transferring drive torque from said input member to said output member, said torque transfer mechanism including an operator for providing torque to a stage 1 ball ramp actuator, said stage 1 ball ramp actuator supplying a force to a stage 1 clutch, said stage 1 clutch coupled in series with a stage 2 ball ramp actuator operable to selectively provide an amplified input force to a stage 2 clutch, wherein said stage 1 ball ramp actuator includes a first spring for biasing a second cam plate of said stage 1 ball ramp actuator toward an axially fixed first cam plate of said stage 1 ball ramp actuator and said stage 2 ball ramp actuator includes a second spring for biasing a second cam plate of said stage 2 ball ramp actuator toward a first cam plate of said stage 2 ball ramp actuator.

17. The power transmission device of claim 16 wherein said stage 1 clutch includes an interleaved clutch pack having a first set of clutch plates fixed for rotation with said input member and a second set of clutch plates fixed for rotation with a portion of said stage 2 ball ramp actuator.

18. The power transmission device of claim 17 wherein said first cam plate of said stage 2 ball ramp actuator is rotatable with said first set of clutch plates, said second cam plate fixed for rotation with said second set of clutch plates and a plurality of balls are positioned between and drivingly engaged with said first and second cam plates.

19. The power transmission device of claim 16 further including a controller in communication with a vehicle sensor, said controller being operable to selectively signal said operator to produce torque.

20. The power transmission device of claim 19 wherein said operator includes a DC electric motor.

21. The power transmission device of claim 20 wherein said stage 1 ball ramp actuator and said stage 1 clutch operate to amplify torque from said electric motor and provide said amplified torque to said stage 2 ball ramp actuator.

22. The power transmission device of claim 1, wherein second cam plate of said first ball ramp actuator is formed as a unitary member which directly engages said first friction clutch.

* * * * *